Patented Nov. 9, 1948

2,453,430

UNITED STATES PATENT OFFICE 2,453,430

MORPHOLINE SALTS OF SULFONATED AZO DYE COMPONENTS AND THEIR PREPARATION

Harold G. Greig, Princeton, N. J., assignor to Radio Corporation of America, a corporation of Delaware No Drawing. Application December 21, 1944, Serial No. 569,264

14 Claims. (Cl. 260—247)

The present invention relates to morpholine salts of the sulfo acids of cyclic organic compounds having a sulfonic acid group linked to a ring carbon atom thereof and to a process of producing the same.

It is known that azo dyestuffs are prepared by diazotizing an aromatic amine and coupling the resulting diazonium compound with an azo coupling component. The diazotizable amines employed are primary aromatic amines of the benzene, naphthalene, anthracene and the like series. The azo coupling components, on the other hand, are usually phenols or compounds having a reactive methylene group such as pyrazolones, acetoacetic acid arylides and the like.

The majority of the azo dye components are not per se soluble in water. It is, therefore, customary practice to include in such components, water-solubilizing groups, particularly sulfonic acid groups. The components are then utilized in the form of the alkali metal, particularly the sodium salts.

The azo dyestuffs are utilized not only in the dyeing of fibers but also in other arts such as in color photography for the production of photographic dyestuff images and in electrolytic recording methods for the formation of dyestuff images. When using the azo dyes in these various arts, it is often desirable to produce the dyes from compositions containing the desired components in the dry state. For instance, it has been recommended to employ a composition for dyeing and printing comprising a stabilized diazo amino compound and a coupling compound and to regenerate the diazonium compound for coupling by treating the composition with an acid. It has also been suggested to provide a composition of a diazotizable amine, a nitrite and a coupling component to dissolve the same in water and to impregnate material with the composition for use in facsimile recordings. When these proposals are adopted, the compositions must meet certain tests. For instance, they must readily dissolve in water, they must be stable prior to dissolution in water, and particularly when utilized in the formation of azo dyestuff images in photography and in facsimile recording, they must provide a background stable to light and storage.

The sodium salts of the sulfonic acids of azo dye components, while they provide the desired water solubility, have a number of disadvantages. Thus the sodium salts have a tendency when dried to darken, a phenomenon which is particularly noticeable where the component contains a plurality of sulfonic acid groups. Such darkening is apt to be reflected in the final color of the dyestuff and may result in a distortion of the shade of the dye.

On the other hand, if it be desired to avoid the darkening, particularly when utilizing the polysulfonic acids, by only partially neutralizing the component, if the component be employed in a dry composition, the acidity imparted to the composition may have a deleterious effect thereon. Assuming, for instance, that the composition contains a stabilized diazo amino compound and an incompletely neutralized sulfonated coupling component, the composition due to the acidity of the coupling component is liable to decomposition of the diazo amino compound with attendant premature coupling. On the other hand, if the composition contains a diazotizable amine, a nitrite and an incompletely neutralized sulfonated coupling component, the acidity thereof is apt to cause premature diazotization and coupling.

Again, in effecting neutralization of azo dye components containing a plurality of sulfonic acid groups, it is necessary to utilize the exact amount of alkali if the product is to be isolated by drying, since otherwise the excess alkali remains in the dry product. If the alkali be added in water solution to the product, the same becomes so soluble in water as to prevent efficient isolation by the salting out method.

I have now discovered that not only these disadvantages in the sodium salts of sulfonated cyclic organic azo dye components can be avoided but that salts manifesting properties not possessed by the sodium salts are obtained if the sulfonated component be neutralized in whole or in part by means of morpholine.

The morpholine salts do not have the undesirable tendency to darken possessed by the sodium salts. They can be prepared and isolated without difficulty since any excess of morpholine employed in the preparation of the salts can be volatilized therefrom at low temperatures.

It is accordingly an object of the present invention to produce sulfonated cyclic organic compounds in which at least one of the sulfonic acid groups is neutralized by morpholine.

A further object of this invention is the preparation of sulfonated phenol in which at least one sulfonic acid group is neutralized by morpholine.

A further object of this invention is a naphthol sulfonic acid in which at least one of the sulfonic acid groups is neutralized by morpholine.

A further object of this invention is a phenol containing a plurality of sulfonic acid groups, each of which is neutralized with morpholine.

A further object of this invention is naphthol polysulfonic acids in which all of the sulfonic acid groups are neutralized with morpholine.

A further object of this invention is a phenol containing a plurality of sulfonic acid groups at least one of which is neutralized by morpholine and another an alkali such as an alkali metal or an organic amine.

Another object of this invention is chromotropic acid the sulfonic acid groups of which are neutralized by means of morpholine.

The morpholine salts of the cyclic organic compounds having a sulfonic acid group linked to a ring carbon atom thereof can be simply prepared in a number of ways. For instance, the sulfonic acid may be slurried with an amount of morpholine in excess of that theoretically required to neutralize the sulfonic acid groups present and sufficient to give a smooth, uniformly wet paste. The excess of morpholine is then removed by volatilization at a temperature between about 65 to 70° C. In this way, all of the sulfonic acid groups in the component are neutralized by the morpholine.

As an alternative, one mol of the sulfonic acid is reacted with an amount of morpholine theoretically necessary to neutralize the sulfonic acid groups present, the reaction being effected in a closed vessel such as a ball mill by means of which thorough mixing of the reactants can be accomplished. The reaction mixture is then dried at a low temperature such as that given above.

The ratio of the sulfonic acid to the morpholine varies depending upon the particular sulfonic acid utilized and the results desired. If, for example, the acid is a disulfonic acid and it is desired to neutralize only one sulfonic acid group, then one mol of the sulfonic acid is utilized for one mol of morpholine. If, however, the disulfonic acid is to be completely neutralized, then at least two mols of morpholine are used for each mol of the acid. In a similar way, when using a trisulfonic acid, it is possible to neutralize one, two or all three of the acid groups present.

Furthermore, by a proper proportioning of the reactants, the acids may be converted into mixed salts of morpholine and another neutralizing agent such as an alkali metal, i. e., sodium, potassium or the like, or an organic amine such as an alkylamine, i. e., ethylamine, propylamine, butylamine, dimethylamine, diethylamine, and the like, an arylamine such as aniline, phenylmethylamine, or the like, or an alkylolamine such as monoethanolamine, diethanolamine, triethanolamine, propanolamine, dipropanolamine, dibutanolamine and the like.

The sulfonic acids of any of the diazotizable aromatic amines may be neutralized by means of morpholine in the manner stated above. Examples of diazotizable aromatic amines which may be treated for the purpose of neutralizing the sulfonic acid groups with morpholine are:

1-amino-2.4-disulfo-8-hydroxynaphthalene having the formula

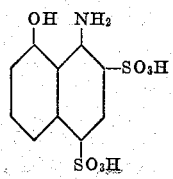

2-amino-8-naphthol-6-sulfonic acid
1-phenylamino-4-aminobenzene-2-sulfonic acid
1-amino-2-naphthol-4-sulfonic acid
1-aminobenzene-3-sulfonic acid
1-aminobenzene-4-sulfonic acid
1-amino-2.5-dichlorobenzene-4-sulfonic acid
1-methyl-2-aminobenzene-5-sulfonic acid
1-methyl-4-aminobenzene-2-sulfonic acid
4.4'-diaminodiphenyl-2.2'-disulfonic acid having the formula

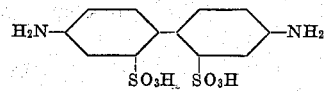

4.4'-diamino-3.3'-dimethyl-6.6'-disulfodiphenyl
1-naphthylamine-2-sulfonic acid
1-naphthylamine-4-sulfonic acid
1-naphthylamine-5-sulfonic acid
2-naphthylamine-1-sulfonic acid
2-naphthylamine-5-sulfonic acid
2-naphthylamine-3.6-disulfonic acid
2-naphthylamine-5.7-disulfonic acid
4.4'-diaminodiphenyl-3.3'-disulfonic acid
1-amino-2-nitrobenzene-4-sulfonic acid
2-aminodiphenyl-4'-sulfonic acid
4.4'-diaminodiphenyl-2-sulfonic acid
4-aminodiphenylamine-2-sulfonic acid
1-naphthylamine-4-acetylamino-7-sulfonic acid
1.4-diaminobenzene-6-sulfonic acid
6-amino-1-naphthol-3-sulfonic acid
8-amino-1-naphthol-2.4-disulfonic acid
8-amino-1-naphthol-3.6-disulfonic acid
3-amino-2-naphthol-7-sulfonic acid
1-naphthylamine-3.6.8-trisulfonic acid and the like.

Examples of sulfonated cyclic organic coupling components the morpholine salts of which are contemplated by the present invention are:

2-hydroxynaphthalene-6-sulfonic acid
2-hydroxynaphthalene-8-sulfonic acid
1-hydroxy-8-amino-naphthalene-3.6-disulfonic acid
1.8-dihydroxy-naphthalene-3.6-disulfonic acid
1-hydroxy-naphthalene-3.6-disulfonic acid
1-hydroxy-8-amino-naphthalene-3.5-disulfonic acid having the formula

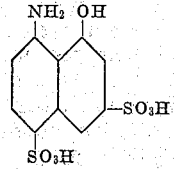

1-hydroxy-8-acetylamino naphthalene-3.6-disulfonic acid
1-hydroxy-8-amino naphthalene - 6.7 - disulfonic acid
1.7-dihydroxy naphthalene-3.6-disulfonic acid
1-hydroxynaphthalene-3.6.8-trisulfonic acid
1.3-dihydroxynaphthalene-5.7-disulfonic acid
1.5-dihydroxynaphthalene-2.7-disulfonic acid
1.5-dihydroxynaphthalene-3.7-disulfonic acid
1.7-dihydroxynaphthalene-3.6-disulfonic acid 1-hydroxy-7-amino naphthalene-3.6-disulfonic acid
2-naphthol-3.6-disulfonic acid
2-naphthol-6.8-disulfonic acid
8-hydroxyquinoline-5-sulfonic acid
1-(N-phenyl)-naphthylamine-8-sulfonic acid
1-(4'-sulfophenyl)-3-methyl-5-pyrazolone having the formula

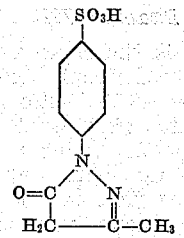

1-(4'-sulfophenyl)-3-carboxy-5-pyrazolone
6.6'-ureylene-di-(1-naphthol-3-sulfonic acid)
6.6'-amino-di(1-naphthol-3-sulfonic acid)
8-acetylamino-1-naphthol-3.6-disulfonic acid
2.6-diaminopyridine disulfonic acid The morpholine salts of the amines may be employed as such for diazotization and subsequent coupling or they may be employed in the form of the stabilized diazo amino compounds. Any of the aforesaid amines after diazotization may be stabilized by reacting the diazonium compound in an alkaline solution with an alkyl, an aryl or a heterocyclic amine. Examples of such amines serving to stabilize the diazonium compounds are:

ethanolamine
diethanolamine
sarcosine
diisopropanolamine
morpholine
cyclohexylamine
2-5-dihydroxy-dicyclohexylamine-3'-carboxylic acid
p-hydroxy cyclohexenyl glycine
methyl glucamine
alpha-carboxy pyrrolidine
alpha-1-alpha-2-dicarboxy pyrrolidine
carboxy-piperidine
loiponic acid
beta-carboxy-piperidine
tetrahydroquinoline
piperidine
carbazole
diglycolamino acid
benzyl-xylamine
4-sulfo-2-amino benzoic acid
dibenzylamine-disulfonic acid
taurine
cyclohexylamino-acetic acid
morpholine
2-methylamino-4-sulfo benzoic acid
methyl mannamine
dimethylamine
diethylamine
dibutylamine Examples of stable diazoamino compounds illustrative of those which I have employed in carrying out the invention are the following:

1 mol of tetrazotized benzidine-3.3'-disulfonic acid+2 moles of diethanolamine
1 mol of diazotized naphthionic acid+1 mol of diethanolamine
1 mol of diazotized naphthionic acid+2 moles of diethanolamine
1 mol of diazotized naphthionic acid+1 mol of diiso propanolamine
1 mol of diazotized naphthionic acid+1 mol of monoethanolamine
1 mol of diazotized naphthionic acid+1 mol of morpholine
1 mol of diazotized alpha naphthylamine-4.8-disulfonic acid+1 mol of diethanolamine
1 mol of diazotized alpha naphthylamine-4.8-disulfonic acid+2 moles of diethanolamine
1 mol of diazotized alpha naphthylamine-5-sulfonic acid+1 mol of diethanolamine
1 mol of diazotized beta naphthylamine-5-sulfonic acid+1 mol of diethanolamine
1 mol of diazotized naphthylamine-3.6-disulfonic acid+1 mol of diethanolamine
1 mol of diazotized naphthionic acid+1 mol of cyclohexylamine
1 mol of diazotized naphthionic acid+1 mol of 2.5-dihydroxy-dicyclohexylamine-3'-carboxylic acid
1 mol of diazotized naphthionic acid+1 mol of p-hydroxy cyclohexenyl glycine
1 mol of diazotized naphthionic acid+1 mol of dibutylamine
1 mol of diazotized naphthionic acid+1 mol of di-2-ethylhexylamine
1 mol of diazotized naphthionic acid+1 mol of 4-sulfo-2-amino benzoic acid
1 mol of tetrazotized dianisidine+2 mols of 4-sulfo-2-amino benzoic acid
1 mol of diazotized naphthionic acid+1 mol of alpha-hydroxy pyrrolidine
1 mol of diazotized naphthionic acid+1 mol of gamma-hydroxy piperidine
1 mol of diazotized naphthionic acid+1 mol of carbazole-2-sulfonic acid
1 mol of diazotized naphthionic acid+1 mol of alpha-carboxy pyrrolidine
1 mol of diazotized naphthionic acid+2 mols of morpholine The following examples will serve to illustrate my invention although it is to be understood that the invention is not limited thereto:

*Example I*

1 mol of chromotropic acid in the form of a finely ground dry powder is slurried with 5.5 mols of morpholine until a smooth, thick paste is obtained. This paste is stirred at room temperature until the mix has become uniform and thoroughly wet throughout. The excess morpholine is then driven off by heating the composition to a temperature of 65 to 70° C. The product thus obtained is then ground for further use. When dissolved in the ratio of .03 gram mols per liter, it gives a solution having a pH of about 9.5.

The product obtained is the di-morpholine salt of chromotropic acid and has the following formula:

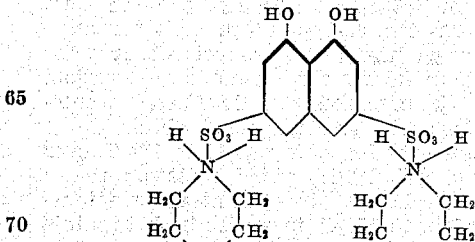

*Example II*

1 mol of R acid is finely ground in a ball mill with 1 mol of morpholine, at room temperature.

Stirring should be continued until the mass has become uniform and thoroughly wet throughout. The product after drying is the mono-morpholine salt of R acid and has the following formula:

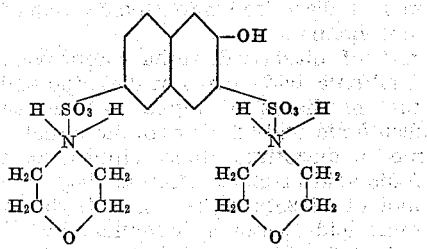

Example III 1 mol of G acid in the form of a finely ground dry powder is slurried with about 5 mols of morpholine to form a thick paste. After stirring at room temperature to make the paste uniform, it is heated to a temperature of 65 to 70° C. to remove excess morpholine. The dry di-morpholine salt of G acid is thus obtained.

Example IV

.75 mol of diisopropanolamine is dissolved in 5.74 mols of morpholine. 1 mol of chromotropic acid in a dry, finely ground condition is slurried with the morpholine solution. The product is then dried at a temperature of about 70° C. A product having a dark gray color is thus obtained. This product is the mixed salt of diisopropanolamine and morpholine of the formula:

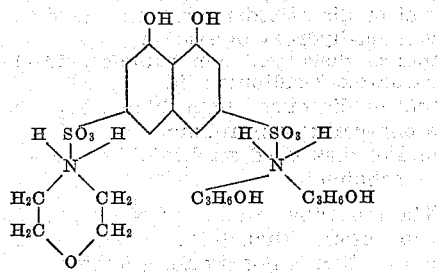

Example V 1 mol of naphthionic acid is slurried with an excess of morpholine until a smooth, thick paste is obtained. This paste is stirred at room temperature until the mixture has become thoroughly wet throughout. The excess morpholine is then driven off by heating the composition to a temperature of about 70° C. The product thus obtained is the morpholeum salt of naphthionic acid.

Example VI 1 mol of sodium naphthionate is diazotized with 1 mol of sodium nitrite at a temperature of 5 to 10° C.

by means of 280 cc. of 38% hydrochloric acid. The diazotization compound precipitates as a thick, creamy slurry. The product is stirred for one hour to make it more amenable to filtration. The filter cake obtained upon filtration is reslurried in water until a smooth paste is obtained.

This paste is added slowly at 10 to 15° C. over a one-hour period with rapid agitation to an excess of morpholine while maintaining a temperature of 10 to 15° C. in an ice bath to minimize decomposition. The reaction is complete when all of the diazonium compound has been added. Excess morpholine is removed by heating the composition to a temperature of about 70° C. There is thus obtained the diazotized naphthionic acid stabilized with morpholine, the sulfonic acid group of the naphthionic acid being neutralized by means of morpholine.

Example VII

The procedure is the same as in Example I except that the chromotropic acid is replaced by 2-naphthylamine-3.6-disulfonic acid.

Example VIII

The procedure is the same as in Example I except that the chromotropic acid is replaced by 4.4'-diaminostilbene-2.2'-disulfonic acid.

It has been stated above that the morpholine salts possess properties which are not exhibited by the corresponding sodium salts. It has been found, for instance, that the morpholine salt of an azo component couples much more quickly than the sodium salt, particularly if coupling takes place under acid conditions or if acid conditions prevail prior to coupling. Apparently the acid splits the morpholine which then acts as a coupling aid to cause the coupling to proceed at a more rapid rate than if the sodium salt were used or if no morpholine were present.

The pertinency of this observation has been demonstrated by tests, particularly in the preparation of dye images in facsimile recording. In such methods, a traveling web or band impregnated with azo dye components is caused to pass through an electrolytic cell the anode of which is a printer bar. Acid conditions prevail at the printer bar so that if a diazotizable amine or a stabilized diazo amino compound is present, a diazonium compound capable of coupling is produced under the acid conditions. In tests carried out with a naphthionic acid as the diazotizable amine and chromotropic acid in the form of its sodium salt as the coupling agent, dye formation did not take place until after the paper had traveled several inches beyond the printer bar. However, when using the morpholine salt of chromotropic acid in lieu of the sodium salt, color develops almost as soon as the paper leaves the printer bar. This test emphasizes the fact that the morpholine salt is much more amenable to coupling than the sodium salt, a factor which is of the greatest importance in producing dye images in color photography or in facsimile recording.

Where azo dye components are employed for the purpose of producing localized dye images as, for instance, in photography or in facsimile recording, the components are incorporated uniformly throughout the film or throughout the traveling web or band. After dye formation, the components which have not been developed in color should be removed. It is, however, difficult to remove the components completely. Oftentimes the residual components remaining cause a darkening of the background of the film or recording material, particularly when exposed to light or when stored for long periods of time. It has been found that this tendency to background darkening, while being very pronounced where the sodium salts are employed, is materially lessened where the morpholine salts are utilized. The morpholine salts therefore appear to be much more stable to the action of light and air than are the corresponding sodium salts. The superiority of the morpholine salts in this respect is of very great importance where dye images are locally formed, since it serves to a great extent to overcome the problem presented by the difficulty of removing the components from those portions of a film or recording paper which serve as a background for the dye images.

Various modifications of my invention will occur to persons skilled in the art and I therefore do not intend to be limited in the patent granted except as required by the prior art and the appended claims.

I claim:

1. The process of producing a morpholinium salt of a sulfonated cyclic organic compound having a sulfonic acid group directly linked to a ring carbon atom, which comprises reacting at least one mol of the sulfonated cyclic organic compound with at least one mol of morpholine at a temperature sufficient to volatilize any excess morpholine.

2. A naphthol sulfonic acid in which at least one sulfonic acid group is neutralized by means of morpholine.

3. Naphthol polysulfonic acids in which at least one sulfonic acid group is neutralized by means of morpholine.

4. Naphthol polysulfonic acids in which at least one sulfonic acid group is neutralized by a member selected from the class consisting of alkali metals and alkylolamines and at least one other sulfonic acid group is neutralized by means of morpholine.

5. Naphthol disulfonic acids in which both sulfonic acid groups are neutralized by morpholine.

6. A compound of the following constitution:

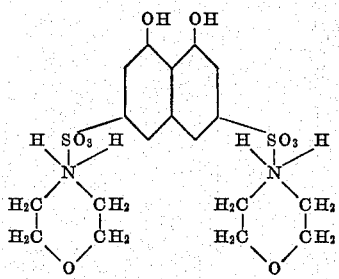

7. The process of producing a morpholinium salt of a naphthol sulfonic acid which comprises reacting 1 mol of the acid with at least 1 mol of morpholine at a temperature sufficient to volatilize any excess morpholine.

8. The process of producing a morpholinium salt of a naphthol polysulfonic acid which comprises reacting 1 mol of the acid with at least 1 mol of morpholine at a temperature sufficient to volatilize any excess morpholine.

9. The process as defined in claim 7 wherein the naphthol sulfonic acid is chromotropic acid.

10. The process as defined in claim 7 wherein the amount of morpholine employed is that theoretically necessary to convert all of the sulfonic acid groups of the naphthol polysulfonic acid into their morpholinium salts.

11. The process of producing a morpholinium salt of chromotropic acid which comprises reacting 1 mol of the acid with at least 1 mol of morpholine at a temperature between 65 and 70° C.

12. The process of producing the di-morpholinium salt of chromotropic acid which comprises reacting one mol of the acid with an excess over 2 mols of morpholine at a temperature of 65 to 70° C.

13. Naphthionic acid, the sulfonic acid group of which is neutralized by morpholine.

14. A phenol containing the grouping

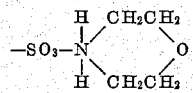

the sulfur atom of which is directly linked to a ring carbon atom.

HAROLD G. GREIG.

REFERENCES CITED

The following references are of record in the file of this patent:

UNITED STATES PATENTS

| Number | Name | Date |
| --- | --- | --- |
| 826,279 | Schirmacher | July 17, 1906 |
| 1,975,340 | Winker | Oct. 2, 1934 |
| 2,124,594 | Schmelzer | July 26, 1938 |
| 2,125,087 | Schmelzer | July 26, 1938 |
| 2,132,405 | Schmelzer | Feb. 18, 1941 |
| 2,306,471 | Solomon | Dec. 29, 1942 |

FOREIGN PATENTS

| Number | Country | Date |
| --- | --- | --- |
| 180,884 | Switzerland | Feb. 1, 1936 |